(12) United States Patent
Kim et al.

(10) Patent No.: US 12,304,371 B2
(45) Date of Patent: May 20, 2025

(54) DUCT FOR VENTILATION SEAT OF VEHICLE

(71) Applicants: Hyundai Motor Company, Seoul (KR); Kia Corporation, Seoul (KR); Kbautotech Co., Ltd., Chungcheongnam-do (KR)

(72) Inventors: Mu Young Kim, Gyeonggi-do (KR); Sang Do Park, Gyeonggi-do (KR); Ho Suk Jung, Gyeonggi-do (KR); Ju Yeol Kong, Gyeonggi-do (KR); Chan Ho Jung, Gyeonggi-do (KR); Jun Young Yun, Gyeonggi-do (KR); Tae Soo Sung, Chungcheongnam-do (KR); Yong Jun Jo, Chungcheongnam-do (KR); Ho Chang Jin, Chungcheongnam-do (KR)

(73) Assignees: Hyundai Motor Company, Seoul (KR); Kia Corporation, Seoul (KR); Kbautotech Co., Ltd., Chungcheongnam-do (KR)

( * ) Notice: Subject to any disclaimer, the term of this patent is extended or adjusted under 35 U.S.C. 154(b) by 178 days.

(21) Appl. No.: 18/138,464

(22) Filed: Apr. 24, 2023

(65) Prior Publication Data
US 2024/0190312 A1  Jun. 13, 2024

(30) Foreign Application Priority Data

Dec. 12, 2022 (KR) .......................... 10-2022-0172857

(51) Int. Cl.
*B60N 2/56* (2006.01)
*B60N 2/22* (2006.01)

(52) U.S. Cl.
CPC .................................. *B60N 2/5657* (2013.01)

(58) Field of Classification Search
CPC ...... B60N 2/5657; B60N 2/5635; B60N 2/22; B60N 2/5628; B60H 1/00285
See application file for complete search history.

(56) References Cited

U.S. PATENT DOCUMENTS 11,167,672 B2 * 11/2021 Hoshi .................. B60N 2/5657
11,203,277 B1 * 12/2021 Yu ........................ B60N 2/5657
(Continued)

FOREIGN PATENT DOCUMENTS

KR   2010-0010265 A   2/2010
KR   2011-0091080 A   8/2011
(Continued)

*Primary Examiner* — Shin H Kim
(74) *Attorney, Agent, or Firm* — Fox Rothschild LLP

(57) ABSTRACT

A duct for a ventilation seat of a vehicle includes a seat cushion duct and a seatback duct that are interconnected so as to communicate with each other via a telescopic sliding duct. The telescopic sliding duct is variable in length in a forward-backward direction such that a length of the telescopic sliding duct interconnecting the seat cushion duct and the seatback duct may be increased when the seatback is folded, and the length of the telescopic sliding duct interconnecting the seat cushion duct and the seatback duct may be reduced when the seatback is unfolded. Because the telescopic sliding duct can vary in length, it is possible to avoid damage due to a load applied to the telescopic sliding duct by folding and unfolding operations of the seatback. Further, it is possible to easily supply air to the seatback and the seat cushion without leakage of air.

17 Claims, 8 Drawing Sheets

(56) References Cited

U.S. PATENT DOCUMENTS

| | | | |
|---|---|---|---|
| 11,325,510 B2* | 5/2022 | Arata | B60N 2/565 |
| 2017/0080837 A1* | 3/2017 | Cho | B60N 2/5678 |
| 2018/0065525 A1* | 3/2018 | Higashihara | B60N 2/5657 |
| 2019/0092197 A1* | 3/2019 | Arata | B60N 2/22 |
| 2021/0101509 A1* | 4/2021 | Hoshi | B60N 2/5628 |
| 2024/0190312 A1* | 6/2024 | Kim | B60N 2/5628 |
| 2024/0409013 A1* | 12/2024 | Kojima | B60N 2/5685 |

FOREIGN PATENT DOCUMENTS

| | | |
|---|---|---|
| KR | 2019-0053541 A | 5/2019 |
| KR | 2021-0156021 A | 12/2021 |

* cited by examiner

FIG. 1A (PRIOR ART)
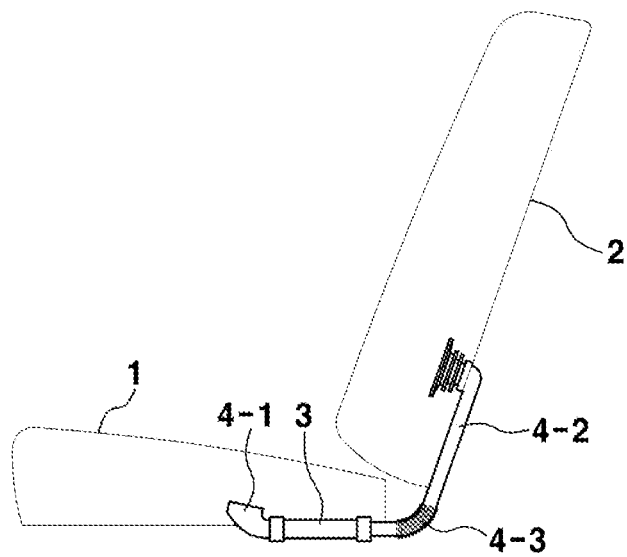
FIG. 1A (PRIOR ART)
FIG. 1B (PRIOR ART)
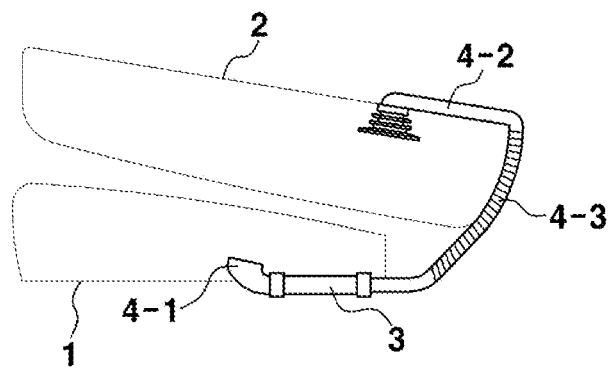
FIG. 1B (PRIOR ART)

DUCT FOR VENTILATION SEAT OF VEHICLE

CROSS-REFERENCE TO RELATED APPLICATION

This application claims under 35 U.S.C. § 119(a) the benefit of Korean Patent Application No. 10-2022-0172857 filed on Dec. 12, 2022, the entire contents of which are incorporated herein by reference.

BACKGROUND

(a) Technical Field

The present disclosure relates to a duct for a ventilation seat of a vehicle, more particularly, to the duct for the ventilation seat configured to allow a seat cushion duct and a seatback duct to be interconnected so as to communicate with each other using a telescopic sliding duct configured to be variable in length when a seatback is folded and unfolded.

(b) Description of the Related Art

A ventilation seat for a vehicle may be provided as a user convenience feature of the vehicle. Typically, the ventilation seat is configured to allow air propelled by a blower to be blown to air discharge holes in a seat cushion and a seatback through a duct, thereby quickly removing heat and moisture from an area where an occupant contacts a seat, thus providing a cooling effect for the convenience and comfort of the occupant.

To this end, a blower for blowing cool air and a duct for forming an air flow path, through which air blown from the blower is delivered to the air discharge holes in the seat cushion and the seatback, are mounted in the ventilation seat.

FIGS. 1A and 1B (PRIOR ART) are views schematically showing a conventional ventilation seat.

As shown in FIGS. 1A and 1B, the conventional ventilation seat includes a blower 3 mounted under a seat cushion 1 to blow air in a distributed manner, a first duct 4-1 disposed between one outlet portion of the blower 3 and the seat cushion 1 so as to be connected to the blower 3, and a second duct 4-2 disposed between another outlet portion of the blower 3 and a seatback 2 so as to be connected to the blower 3. A portion of the second duct 4-2 is formed as a corrugated pipe 4-3 in consideration of the rotational trajectory of the seatback 2.

As shown in FIG. 1B, when the seatback 2 is folded, the length of the second duct 4-2 may be increased by extension of the corrugated pipe 4-3. In this case, however, because an extended length of the corrugated pipe 4-3 is relatively large, the second duct 4-2 including the corrugated pipe 4-3 may be exposed to the outside of the ventilation seat, and thus may interfere with a vehicle component arranged nearby or may be damaged by external force.

Further, because the corrugated pipe 4-3 repeatedly contracts and expands with repeated folding and unfolding operations of the seatback 2, the corrugated pipe 4-3 may be easily damaged, and thus may cause leakage of air to the outside.

The above information disclosed in this Background section is only for enhancement of understanding of the background of the disclosure, and therefore it may contain information that does not form the related art that is already known in this country to a person of ordinary skill in the art.

SUMMARY

The present disclosure provides a duct for a ventilation seat of a vehicle, in which a seat cushion duct and a seatback duct are interconnected so as to communicate with each other via a telescopic sliding duct configured to be variable in length in a forward-backward direction such that a length of the telescopic sliding duct interconnecting the seat cushion duct and the seatback duct is increased when the seatback is folded and such that the length of the telescopic sliding duct interconnecting the seat cushion duct and the seatback duct is reduced when the seatback is unfolded, which may prevent the telescopic sliding duct from being damaged due to a load applied to the telescopic sliding duct by folding and unfolding operations of the seatback and so as to supply air to the seatback and the seat cushion while preventing leakage of air.

In one aspect, the present disclosure provides a duct for a ventilation seat of a vehicle, including a seat cushion duct, which is connected to a seat cushion to supply air to the seat cushion and is divided into a first seat cushion duct and a second seat cushion duct, a seatback duct connected to a seatback to supply air to the seatback, a blower mounted between the first seat cushion duct and the second seat cushion duct to supply air to the seatback duct and the seat cushion duct, and a telescopic sliding duct, which is disposed between the seat cushion duct and the seatback duct so as to be connected to the seat cushion duct and the seatback duct and is configured to be variable in length.

In a preferred embodiment, the first seat cushion duct may be disposed between one outlet portion of the blower and the seat cushion so as to be connected to the one outlet portion and the seat cushion, and the second seat cushion duct may be disposed between the other outlet portion of the blower and the telescopic sliding duct so as to be connected to the other outlet portion and the telescopic sliding duct.

In another aspect, the present disclosure provides a duct for a ventilation seat of a vehicle, including a seat cushion duct connected to a seat cushion to supply air to the seat cushion, a seatback duct, which is connected to a seatback to supply air to the seatback and is divided into a first seatback duct and a second seatback duct, a blower mounted between the first seatback duct and the second seatback duct to supply air to the seatback duct and the seat cushion duct, and a telescopic sliding duct, which connected between the seat cushion duct and the seatback duct and is configured to be variable in length.

In a preferred embodiment, the first seatback duct may be disposed between one outlet portion of the blower and the seatback so as to be connected to the one outlet portion and the seatback, and the second seatback duct may be disposed between the other outlet portion of the blower and the telescopic sliding duct so as to be connected to the other outlet portion and the telescopic sliding duct.

In another preferred embodiment, the telescopic sliding duct may include a guide duct coupled to the rear end portion of the seat cushion duct so as to communicate with the rear end portion, a moving duct slidably inserted into the guide duct, and an extension duct integrally formed with the lower portion of the seatback duct and extending from the lower portion so as to be slidably inserted into the moving duct.

In still another preferred embodiment, when the seatback is folded from a completely unfolded position toward a completely folded position, the extension duct may slide backward out of the moving duct, and the moving duct may slide backward out of the guide duct.

In yet another preferred embodiment, when the seatback is rotated from a completely folded position toward a completely unfolded position, the extension duct may slide forward and may be inserted into the moving duct, and the moving duct may slide forward and may be inserted into the guide duct.

In still yet another preferred embodiment, the guide duct may include a first separation prevention bump and a second separation prevention bump respectively formed on the front end portion and the rear end portion of the guide duct so as to protrude inwards, and the moving duct may include a first stopper formed on the front end portion of the moving duct so as to protrude outwards and to be caught by the first separation prevention bump or the second separation prevention bump.

In a further preferred embodiment, the moving duct may include a third separation prevention bump and a fourth separation prevention bump respectively formed on the front end portion and the rear end portion of the moving duct so as to protrude inwards, and the extension duct may include a second stopper formed on the front end portion of the extension duct so as to protrude outwards and to be caught by the third separation prevention bump or the fourth separation prevention bump.

In another further preferred embodiment, the seatback duct and the extension duct may be integrally connected to each other via a corrugated pipe in order to achieve a reclining operation of the seatback.

In still another further preferred embodiment, the moving duct may be divided into a first moving duct slidably inserted into the guide duct and a second moving duct slidably inserted into the first moving duct, and the extension duct may be slidably inserted into the second moving duct.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof, illustrated in the accompanying drawings, which are given hereinbelow by way of illustration only, and thus are not limitative of the present disclosure, and wherein:

FIGS. 1A and 1B (PRIOR ART) are views schematically showing a conventional ventilation seat;

Figure 2:
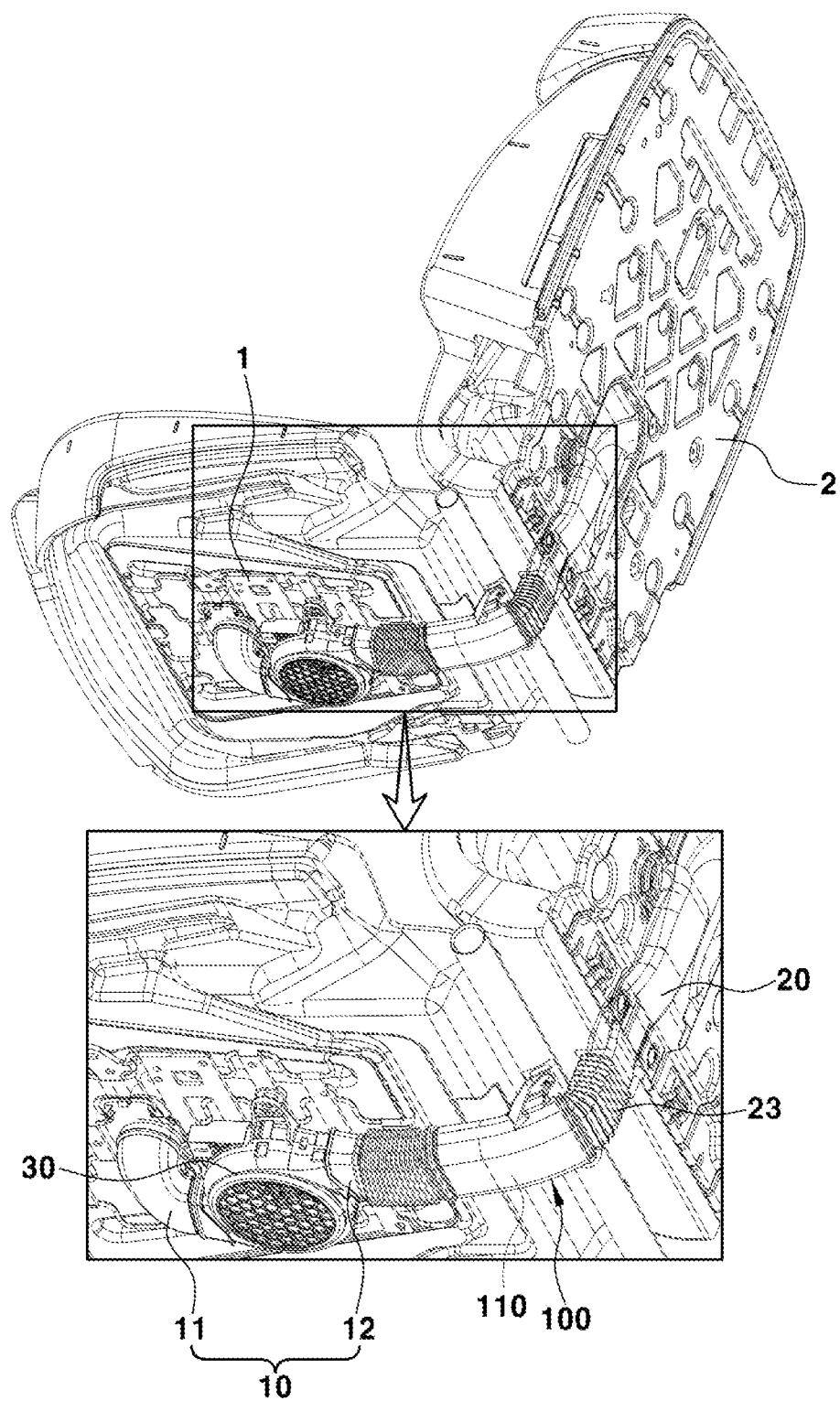
FIG. 2 is a perspective view showing a duct for a ventilation seat of a vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

FIG. 2 is a perspective view showing a duct for a ventilation seat of a vehicle according to an embodiment of the present disclosure. Reference numeral 10 denotes a seat cushion duct.

The seat cushion duct 10 is connected to a seat cushion 1 so as to supply air to the seat cushion 1. The seat cushion duct 10 may be divided into a first seat cushion duct 11 and a second seat cushion duct 12 in order to mount a blower 30 to the seat cushion duct 10.

According to one embodiment of the present disclosure, the blower 30 supplies air to the seat cushion 1 through the seat cushion duct 10, and at the same time, supplies air to a seatback 2 through a seatback duct 20. The blower 30 is mounted between the first seat cushion duct 11 and the second seat cushion duct 12.

Therefore, the first seat cushion duct 11 is disposed between one outlet portion of the blower 30 and the seat cushion 1 so as to be connected to the one outlet portion and the seat cushion 1 in order to supply air from the blower 30 to the seat cushion 1, and the second seat cushion duct 12 is disposed between the other outlet portion of the blower 30 and a telescopic sliding duct 100 so as to be connected to the other outlet portion and the telescopic sliding duct 100 in order to supply air from the blower 30 to the telescopic sliding duct 100.

The seatback duct 20 is disposed on the rear surface portion of the seatback 2 such that the upper end portion of the seatback duct 20 is connected to the seatback 2 to supply air to the seatback 2, and the lower end portion of the seatback duct 20 is connected to the telescopic sliding duct 100 so as to communicate with the telescopic sliding duct 100.

Particularly, since the telescopic sliding duct 100 is configured to be variable in length, the same may be disposed between the second seat cushion duct 12 of the seat cushion duct 10 and the seatback duct 20 so as to be connected to and communicate with the second seat cushion duct 12 and the seatback duct 20.

As described above, according to the embodiment of the present disclosure, since the blower 30 is mounted between the first seat cushion duct 11 and the second seat cushion duct 12, which constitute the seat cushion duct 10, outside air (e.g., cool air in the interior) suctioned by the blower 30 may be supplied to the seat cushion 1 through the first seat cushion duct 11, which is connected to one outlet portion of the blower 30, and at the same time, may be supplied to the seatback 2 through the telescopic sliding duct 100, which is connected to the other outlet portion of the blower 30, and the seatback duct 20.

Figure 3:
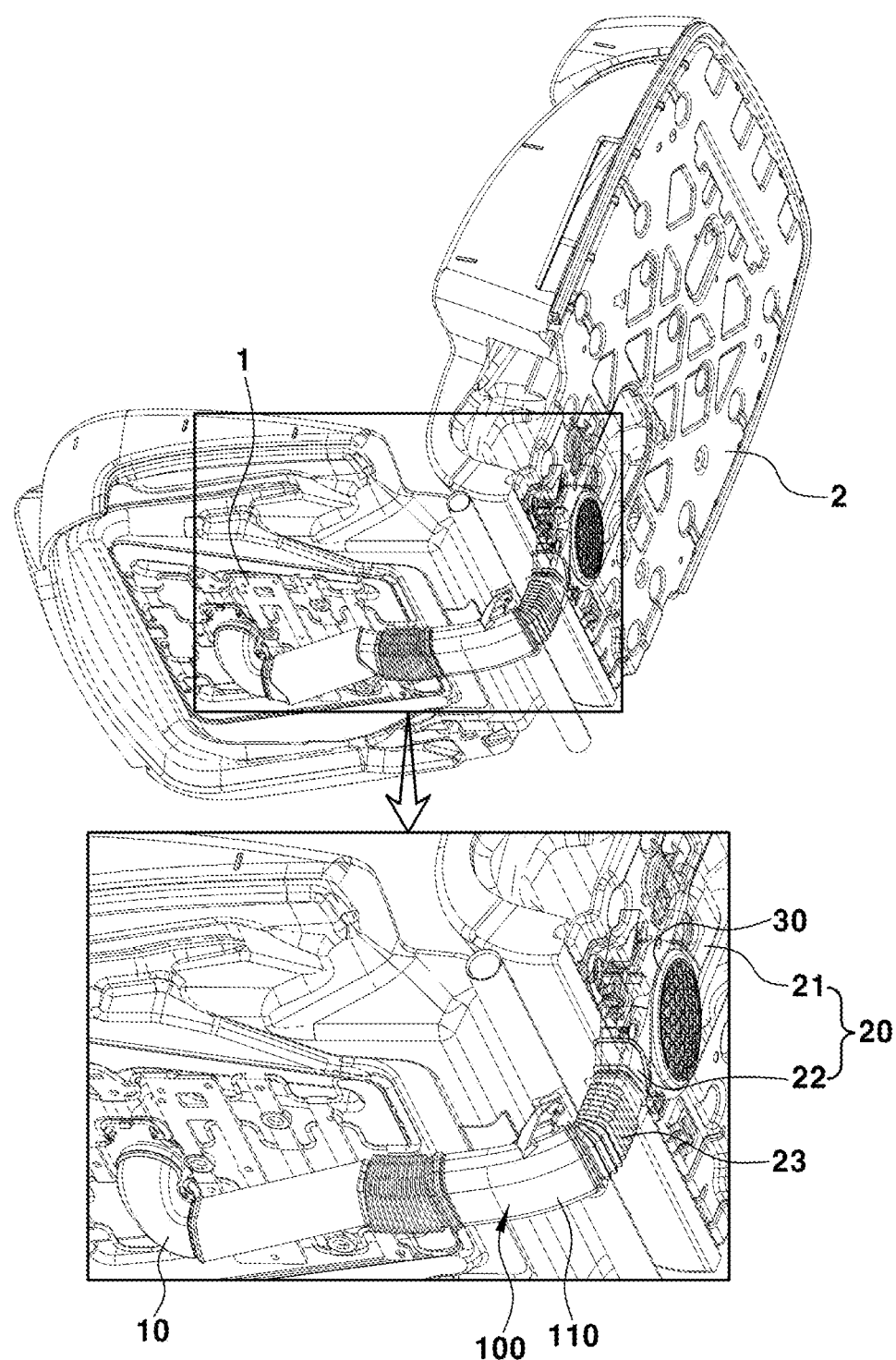
FIG. 3 is a perspective view showing a duct for a ventilation seat of a vehicle according to another embodiment of the present disclosure.

FIG. 3 is a perspective view showing a duct according to another embodiment of the present disclosure. Reference numeral 20 denotes a seatback duct.

The seatback duct 20 is connected to the seatback 2 so as to supply air to the seatback 2. The seatback duct 20 may be divided into a first seatback duct 21 and a second seatback duct 22 in order to mount the blower 30 to the seatback duct 20.

According to another embodiment of the present disclosure, the blower 30 supplies air to the seatback 2 through the seatback duct 20, and at the same time, supplies air to the seat cushion 1 through the seat cushion duct 10. The blower 30 is mounted between the first seatback duct 21 and the second seatback duct 22.

Therefore, the first seatback duct 21 is disposed between one outlet portion of the blower 30 and the seatback 2 so as to be connected to the one outlet portion and the seatback 2 in order to supply air from the blower 30 to the seatback 2, and the second seatback duct 22 is disposed between the other outlet portion of the blower 30 and the telescopic sliding duct 100 so as to be connected to the other outlet portion and the telescopic sliding duct 100 in order to supply air from the blower 30 to the telescopic sliding duct 100.

The seat cushion duct 10 is disposed on the lower surface portion of the seat cushion such that the front end portion of the seat cushion duct 10 is connected to the seat cushion to supply air to the seat cushion 1 and the rear end portion of the seat cushion duct 10 is connected to the telescopic sliding duct 100 so as to communicate with the telescopic sliding duct 100.

Particularly, since the telescopic sliding duct 100 is configured to be variable in length, the same may be disposed between the seat cushion duct 10 and the second seatback duct 22 of the seatback duct 20 so as to be connected to and communicate with the seat cushion duct and the second seatback duct 20.

As described above, according to the other embodiment of the present disclosure, since the blower 30 is mounted between the first seatback duct 21 and the second seatback duct 22, which constitute the seatback duct 20, outside air (e.g., cool air in the interior) suctioned by the blower 30 may be supplied to the seatback 2 through the first seatback duct 21, which is connected to one outlet portion of the blower 30, and at the same time, may be supplied to the seat cushion 1 through the telescopic sliding duct 100, which is connected to the other outlet portion of the blower 30, and the seat cushion duct 10.

Hereinafter, the configuration of the above-described telescopic sliding duct will be described in detail.

Referring to FIGS. 4-7, the telescopic sliding duct 100 may include a guide duct 110, which is coupled to the rear end portion of the seat cushion duct 10 so as to communicate with the rear end portion, a moving duct 120, which is inserted into the guide duct 110 so as to be slidable back and forth, and an extension duct 130, which is integrally formed with the lower portion of the seatback duct 20 and extends from the lower portion so as to be slidably inserted into the moving duct 120.

In the case of the embodiment in which the seat cushion duct 10 is divided into the first seat cushion duct 11 and the second seat cushion duct 12, the guide duct 110 is coupled to the second seat cushion duct 12 so as to communicate with the second seat cushion duct 12.

In the case of the embodiment in which the seatback duct 20 is divided into the first seatback duct 21 and the second seatback duct 22, the extension duct 130 is integrally formed with the lower end portion of the second seatback duct 22 and extends from the lower end portion.

The guide duct 110 includes a first separation prevention bump 111 and a second separation prevention bump 112, which are integrally formed with the front end portion and the rear end portion of the guide duct 110 so as to protrude inwards in order to define the forward-backward sliding distance of the moving duct 120 and to prevent separation of the moving duct 120 from the guide duct 110. In addition, the moving duct 120 includes a first stopper 121, which is integrally formed with the front end portion of the moving duct 120 so as to protrude outwards and thus to be caught by the first separation prevention bump 111 or the second separation prevention bump 112.

When the moving duct 120 inserted into the guide duct 110 moves forward and is located at the most advanced position, the first stopper 121 of the moving duct 120 is caught by the first separation prevention bump 111 formed on the front end portion of the guide duct 110. When the moving duct 120 moves backward and is located at the most retracted position, the first stopper 121 of the moving duct 120 is caught by the second separation prevention bump 112 formed on the rear end portion of the guide duct 110. Accordingly, the forward-backward sliding distance of the moving duct 120 may be defined, and the moving duct 120 may be prevented from being separated from the guide duct 110.

In addition, the moving duct 120 includes a third separation prevention bump 122 and a fourth separation prevention bump 123, which are integrally formed with the front end portion and the rear end portion of the moving duct 120 so as to protrude inwards, and the extension duct 130 includes a second stopper 131, which is integrally formed with the front end portion of the moving duct 120 so as to protrude outwards and thus to be caught by the third separation prevention bump 122 or the fourth separation prevention bump 123.

In this case, in the moving duct 120, the third separation prevention bump 122 is formed at a position farther inward than the first stopper 121.

When the extension duct 130 moves forward and is located at the most advanced position in the moving duct 120, the second stopper 131 of the extension duct 130 is caught by the third separation prevention bump 122 formed on the front end portion of the moving duct 120. When the extension duct 130 moves backward and is located at the most retracted position in the moving duct 120, the second stopper 131 of the extension duct 130 is caught by the fourth separation prevention bump 123 formed on the rear end portion of the moving duct 120. Accordingly, the forward-backward sliding distance of the extension duct 130 in the moving duct 120 may be defined, and the extension duct 130 may be prevented from being separated from the moving duct 120.

In addition, the seatback duct 20 and the extension duct 130 may be integrally connected to each other via a corrugated pipe 23, which is formed so as to be bendable when the seatback is reclined. In the case in which the seatback duct 20 is divided into the first seatback duct 21 and the second seatback duct 22, the second seatback duct 22 and the extension duct 130 may be integrally connected to each other via the corrugated pipe 23, which is bendable when the seatback is reclined.

Meanwhile, the components of the telescopic sliding duct 100 may be assembled so as to be arranged in a direction opposite the direction of arrangement of the components described above.

As one example, in the case of the embodiment in which the blower 30 is mounted between the first seat cushion duct 11 and the second seat cushion duct 12, the telescopic sliding duct 100 may include a guide duct 110, which is coupled to the second seat cushion duct 12 of the seat cushion duct 10, a moving duct 120, which is inserted into the guide duct 110 so as to be slidable back and forth, and an extension duct 130, which is integrally formed with the lower portion of the seatback duct 20 and extends from the lower portion so as to be inserted into the moving duct 120.

As another example, in the case of the embodiment in which the blower 30 is mounted between the first seatback duct 21 and the second seatback duct 22, the telescopic sliding duct 100 may include a guide duct 110, which is coupled to the second seatback duct 22 of the seatback duct 20, a moving duct 120, which is inserted into the guide duct 110 so as to be slidable back and forth, and an extension duct 130, which is integrally formed with the rear end of the seat cushion duct 10 and extends from the rear end so as to be inserted into the moving duct 120.

Hereinafter, the operation of the duct according to the present disclosure configured as described above will be described.

Figure 4:
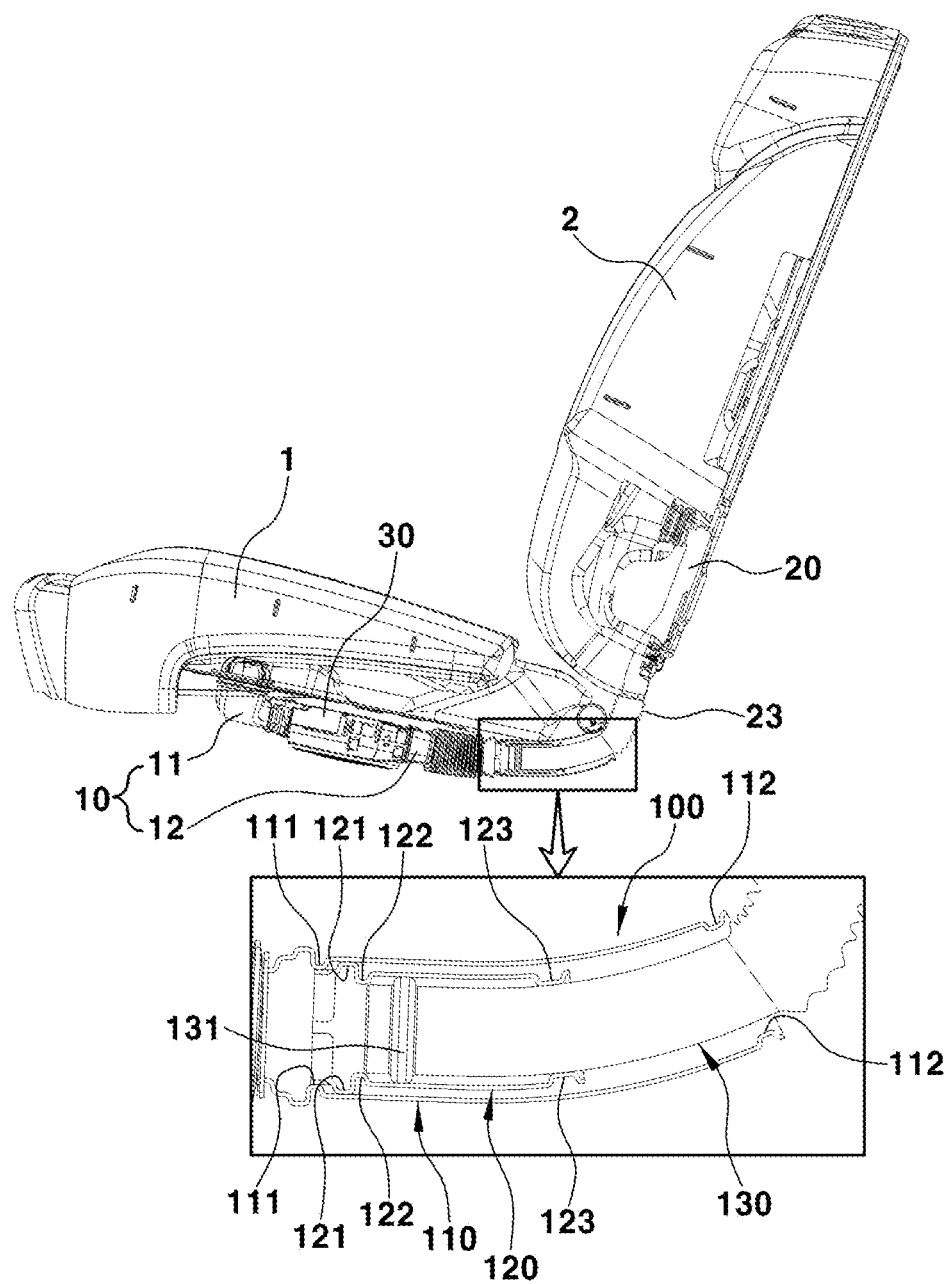
FIG. 4 is a side cross-sectional view showing an arrangement of components of a telescopic sliding duct of the duct according to the present disclosure when a seatback is in a completely unfolded state.

FIG. 4 is a side cross-sectional view showing an arrangement of components of the telescopic sliding duct according to the present disclosure when the seatback is in a completely unfolded state.

When the seatback 2 is in a completely unfolded state, i.e., a state in which an occupant sitting on the seat cushion 1 can lean his/her back and waist against the seatback 2, all of the components of the telescopic sliding duct 100 are arranged so as to overlap each other.

In particular, as shown in FIG. 4, when the seatback 2 is completely unfolded, the moving duct 120 is inserted into the guide duct 110 and moves forward to the most advanced position in the guide duct 110, and the extension duct 130 is also inserted into the guide duct 110 together with the moving duct 120 and moves forward to the most advanced position in the moving duct 120.

When the moving duct 120 moves forward and reaches the most advanced position, the first stopper 121 of the moving duct 120 gets caught by the first separation prevention bump 111 formed on the front end portion of the guide duct 110, whereby the maximum distance that the moving duct 120 can move forward may be limited, and the moving duct 120 may be prevented from being separated from the guide duct 110 toward the seat cushion duct beyond the most advanced position of the moving duct 120.

Figure 5:
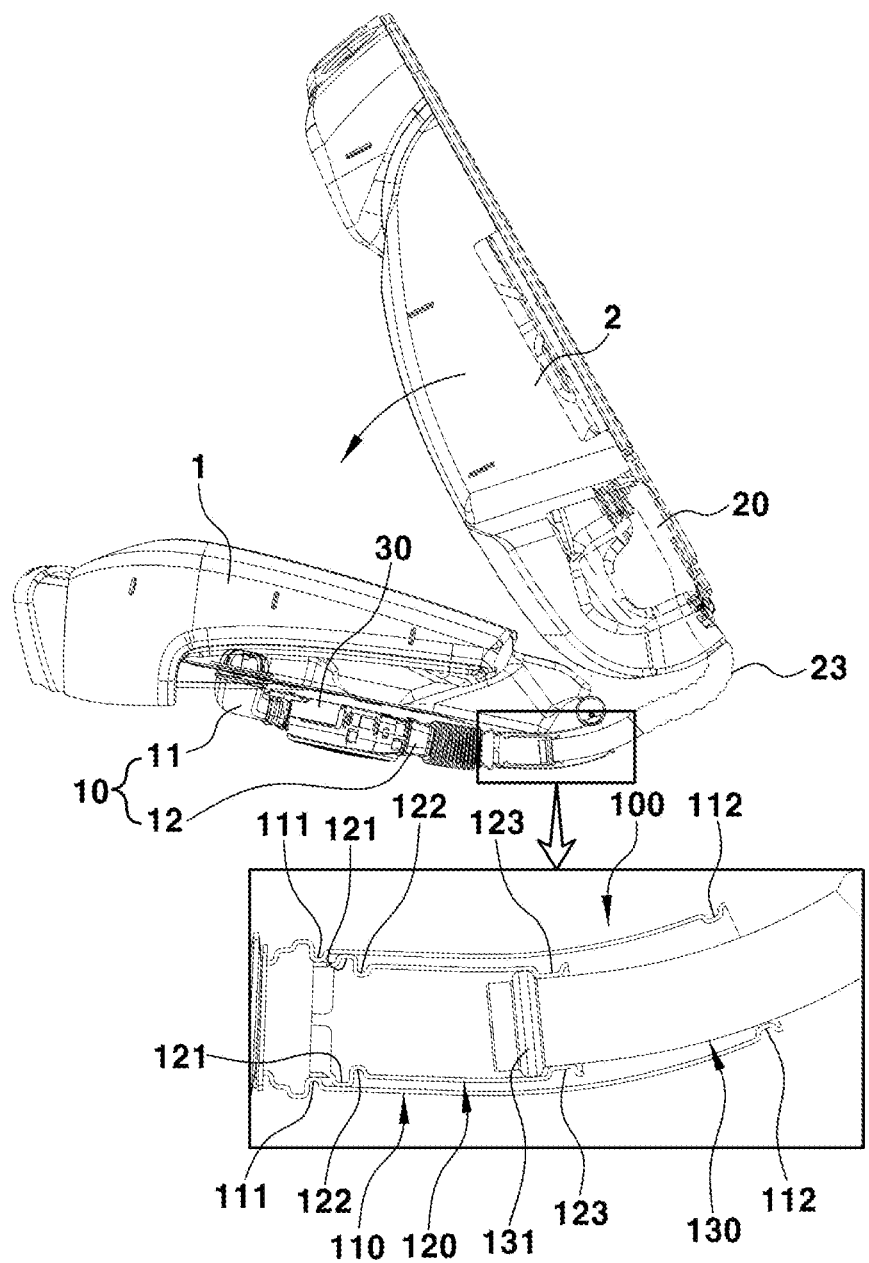
FIG. 5 is a side cross-sectional view showing an arrangement of components of the telescopic sliding duct according to the present disclosure when the seatback is being folded.
Figure 6:
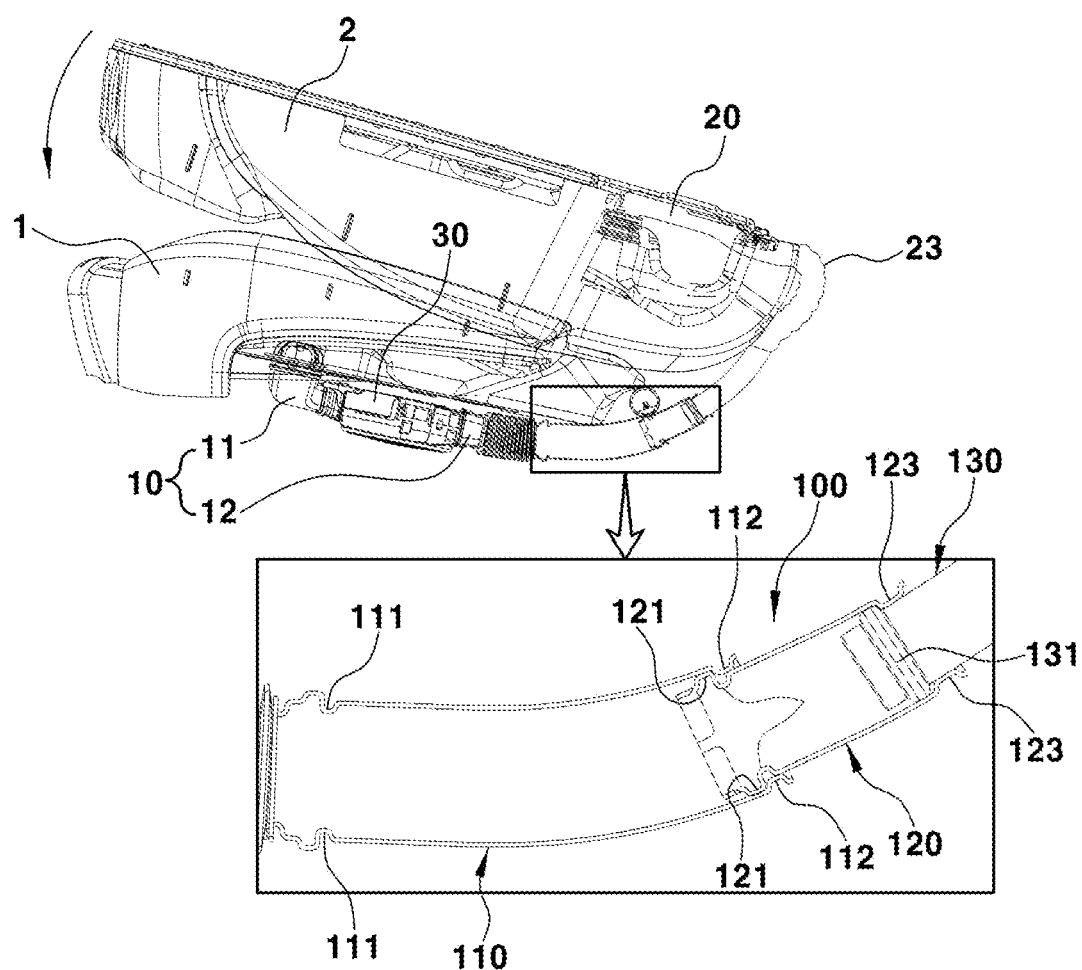
FIG. 6 is a side cross-sectional view showing an arrangement of components of the telescopic sliding duct according to the present disclosure when the seatback is in a completely folded state.

FIG. 5 shows an arrangement of components of the telescopic sliding duct according to the present disclosure when the seatback is being folded, and FIG. 6 shows an arrangement of components of the telescopic sliding duct according to the present disclosure when the seatback is in a completely folded state.

The seatback 2 may be folded onto the seat cushion 1 in order to secure a space for loading items or to increase the efficiency of use of a rear luggage compartment.

As shown in FIG. 5, when the seatback 2 is folded from the completely unfolded position toward the completely folded position, the extension duct 130 slides backward out of the moving duct 120. As shown in FIG. 6, when the seatback 2 is completely folded, the moving duct 120 slides backward out of the guide duct 110 and reaches the most retracted position.

In detail, when the seatback 2 is folded from the completely unfolded position toward the completely folded position, the extension duct 130, which is integrally formed with the seatback duct 20 connected to the seatback 2, slides backward out of the moving duct 120, and subsequently, the second stopper 131 of the extension duct 130 gets caught by the fourth separation prevention bump 123 of the moving duct 120, whereby the extension duct 130 pulls the moving duct 120 backward.

Subsequently, as the extension duct 130 pulls the moving duct 120 backward, as shown in FIG. 6, the moving duct 120 slides backward out of the guide duct 110 together with the extension duct 130 and reaches the most retracted position.

When the moving duct 120 moves backward and reaches the most retracted position, the first stopper 121 of the moving duct 120 gets caught by the second separation prevention bump 112 formed on the rear end portion of the guide duct 110, whereby the maximum distance that the moving duct 120 can move backward may be limited, and the moving duct 120 may be prevented from being separated from the guide duct 110 beyond the most retracted position of the moving duct 120.

As described above, since the length of the telescopic sliding duct 100 is automatically increased when the seatback 2 is folded, it is possible to prevent damage to the telescopic sliding duct 100 and the corrugated pipe 23 during folding operation of the seatback 2 and to keep the air flow path, through which air is supplied to the seat cushion and the seatback, airtight.

Figure 7:
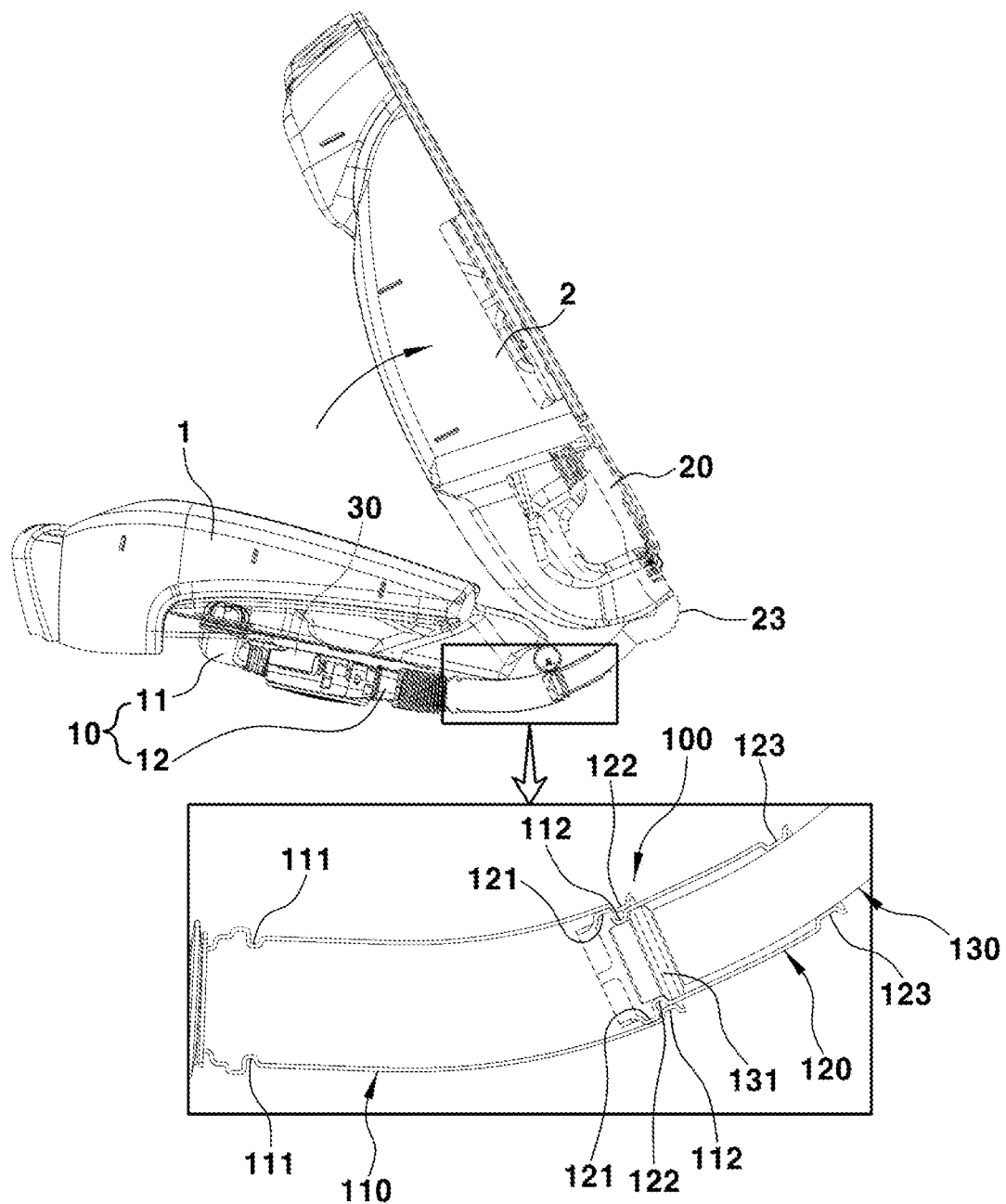
FIG. 7 is a side cross-sectional view showing an arrangement of components of the telescopic sliding duct according to the present disclosure when the seatback is being unfolded.

FIG. 7 is a side cross-sectional view showing an arrangement of components of the telescopic sliding duct according to the present disclosure when the seatback is being unfolded.

As shown in FIG. 7, when the seatback 2 is unfolded from the completely folded position toward the completely unfolded position, the extension duct 130 slides forward and is inserted into the moving duct 120.

In this case, the second stopper 131 of the extension duct 130 comes into contact with the third separation prevention bump 122 formed on the front end portion of the moving duct 120, and thus the extension duct 130 pushes the moving duct 120 forward. Accordingly, the moving duct 120 moves forward and is inserted into the guide duct 110 together with the extension duct 130.

Subsequently, when the seatback 2 reaches the completely unfolded position, as shown in FIG. 4, the moving duct 120 moves forward to the most advanced position in the guide duct 110, and the extension duct 130 also moves forward to the most advanced position in the moving duct 120.

As described above, since the length of the telescopic sliding duct 100, which interconnects the seat cushion duct 10 and the seatback duct 20, is automatically reduced when the seatback 2 is rotated from the completed folded position toward the completely unfolded position, it is possible to prevent damage to the telescopic sliding duct 100 and the corrugated pipe 23 during unfolding operation of the seatback 2, and the components of the telescopic sliding duct 100 may be arranged so as to easily supply air to the seatback and the seat cushion in the unfolded state of the seatback.

In addition, when the seatback 2 is reclined backward, the corrugated pipe 23, which is disposed between the seatback duct 20 and the extension duct 130 so as to be connected to the seatback duct 20 and the extension duct 130, is bent backward, thereby preventing damage to the telescopic sliding duct 100 during reclining operation of the seatback, and the components of the telescopic sliding duct 100 may be arranged so as to easily supply air to the seatback and the seat cushion in the backwardly reclined state of the seatback.

Figure 8:
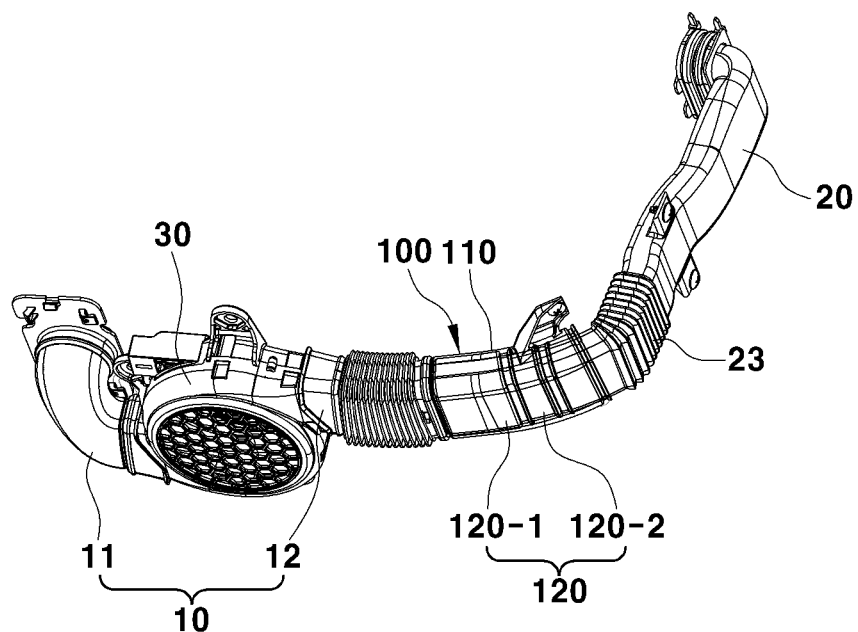
FIG. 8 is a view schematically showing another embodiment of the telescopic sliding duct among components of the duct according to the present disclosure.

FIG. 8 is a view schematically showing another embodiment of the telescopic sliding duct among the components of the duct according to the present disclosure.

As shown in FIG. 8, a telescopic sliding duct 100 according to another embodiment of the present disclosure is characterized in that the moving duct 120 is divided into a first moving duct 120-1 and a second moving duct 120-2.

In some cases, it is necessary to further increase the length of the telescopic sliding duct 100 depending on the specifications of the seat and the folding angle of the seatback. To this end, the moving duct 120 is divided into the first moving duct 120-1 and the second moving duct 120-2, which are coupled to each other so as to be slidable relative to each other and thus to be contractible and expandable, thereby easily further increasing the expandable length of the telescopic sliding duct 100.

As is apparent from the above description, the present disclosure provides the following effects through the embodiments described above.

First, since the seat cushion duct and the seatback duct are connected to each other via the telescopic sliding duct, which is mounted therebetween so as to be slidable in the forward-backward direction, and the length of the telescopic sliding duct is automatically increased when the seatback is folded, it is possible to prevent damage to the telescopic sliding duct during folding of the seatback and to keep the air flow path, through which air is supplied to the seat cushion and the seatback, airtight.

Second, since the length of the telescopic sliding duct, which interconnects the seat cushion duct and the seatback duct, is automatically reduced when the seatback is unfolded, it is possible to prevent damage to the telescopic sliding duct during unfolding of the seatback, and the components of the telescopic sliding duct may be arranged so as to easily supply air to the seatback and the seat cushion in the unfolded state of the seatback.

Third, when the seatback is in an unfolded state, the seatback duct and the seat cushion duct are always maintained in a state of communicating with each other via the telescopic sliding duct. Accordingly, it is possible to easily supply air to the seatback and the seat cushion only using a single blower, thereby reducing the weight of the entire duct and a cost of manufacturing the same compared to a conventional art in which two or more blowers are used to respectively supply air to the seat cushion and the seatback.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A duct for a ventilation seat of a vehicle, the duct comprising:
   a seat cushion duct connected to a seat cushion to supply air to the seat cushion, the seat cushion duct being divided into a first seat cushion duct and a second seat cushion duct;
   a seatback duct connected to a seatback to supply air to the seatback;
   a blower mounted between the first seat cushion duct and the second seat cushion duct to supply air to the seatback duct and the seat cushion duct; and
   a telescopic sliding duct connected between the seat cushion duct and the seatback duct, the telescopic sliding duct being configured to be variable in length,
   wherein the telescopic sliding duct comprises:
   a guide duct coupled to a rear end portion of the seat cushion duct so as to communicate with the rear end portion;
   a moving duct slidably inserted into the guide duct; and
   an extension duct integrally formed with a lower portion of the seatback duct and extending from the lower portion so as to be slidably inserted into the moving duct.

2. The duct of claim 1, wherein the first seat cushion duct is disposed between one outlet portion of the blower and the seat cushion so as to be connected to the one outlet portion and the seat cushion, and wherein the second seat cushion duct is disposed between another outlet portion of the blower and the telescopic sliding duct so as to be connected to the another outlet portion and the telescopic sliding duct.

3. The duct of claim 1, wherein the guide duct comprises a first separation prevention bump and a second separation prevention bump respectively formed on a front end portion and a rear end portion of the guide duct so as to protrude inwards, and wherein the moving duct comprises a first stopper formed on a front end portion of the moving duct so as to protrude outwards and to be caught by the first separation prevention bump or the second separation prevention bump.

4. The duct of claim 1, wherein the moving duct comprises a third separation prevention bump and a fourth separation prevention bump respectively formed on a front end portion and a rear end portion of the moving duct so as to protrude inwards, and wherein the extension duct comprises a second stopper formed on a front end portion of the extension duct so as to protrude outwards and to be caught by the third separation prevention bump or the fourth separation prevention bump.

5. The duct of claim 1, wherein, when the seatback is folded from a completely unfolded position toward a completely folded position, the extension duct slides backward out of the moving duct, and the moving duct slides backward out of the guide duct.

6. The duct of claim 1, wherein, when the seatback is rotated from a completely folded position toward a completely unfolded position, the extension duct slides forward and is inserted into the moving duct, and the moving duct slides forward and is inserted into the guide duct.

7. The duct of claim 1, wherein the seatback duct and the extension duct are integrally connected via a corrugated pipe in order to achieve a reclining operation of the seatback.

8. The duct of claim 1, wherein the moving duct is divided into:
a first moving duct slidably inserted into the guide duct; and
a second moving duct slidably inserted into the first moving duct,
wherein the extension duct is slidably inserted into the second moving duct.

9. A duct for a ventilation seat of a vehicle, the duct comprising:
a seat cushion duct connected to a seat cushion to supply air to the seat cushion;
a seatback duct connected to a seatback to supply air to the seatback, the seatback duct being divided into a first seatback duct and a second seatback duct;
a blower mounted between the first seatback duct and the second seatback duct to supply air to the seatback duct and the seat cushion duct; and
a telescopic sliding duct disposed between the seat cushion duct and the seatback duct so as to be connected to the seat cushion duct and the seatback duct, the telescopic sliding duct being configured to be variable in length,
wherein the telescopic sliding duct comprises:

a guide duct coupled to a rear end portion of the seat cushion duct so as to communicate with the rear end portion;
a moving duct slidably inserted into the guide duct; and
an extension duct integrally formed with a lower portion of the seatback duct and extending from the lower portion so as to be slidably inserted into the moving duct.

10. The duct of claim 9, wherein the first seatback duct is disposed between one outlet portion of the blower and the seatback so as to be connected to the one outlet portion and the seatback, and wherein the second seatback duct is disposed between another outlet portion of the blower and the telescopic sliding duct so as to be connected to the another outlet portion and the telescopic sliding duct.

11. The duct of claim 9, wherein the guide duct comprises a first separation prevention bump and a second separation prevention bump respectively formed on a front end portion and a rear end portion of the guide duct so as to protrude inwards, and wherein the moving duct comprises a first stopper formed on a front end portion of the moving duct so as to protrude outwards and to be caught by the first separation prevention bump or the second separation prevention bump.

12. The duct of claim 9, wherein the moving duct comprises a third separation prevention bump and a fourth separation prevention bump respectively formed on a front end portion and a rear end portion of the moving duct so as to protrude inwards, and wherein the extension duct comprises a second stopper formed on a front end portion of the extension duct so as to protrude outwards and to be caught by the third separation prevention bump or the fourth separation prevention bump.

13. The duct of claim 9, wherein, when the seatback is folded from a completely unfolded position toward a completely folded position, the extension duct slides backward out of the moving duct, and the moving duct slides backward out of the guide duct.

14. The duct of claim 9, wherein, when the seatback is rotated from a completely folded position toward a completely unfolded position, the extension duct slides forward and is inserted into the moving duct, and the moving duct slides forward and is inserted into the guide duct.

15. The duct of claim 9, wherein the seatback duct and the extension duct are integrally connected to each other via a corrugated pipe in order to achieve a reclining operation of the seatback.

16. The duct of claim 9, wherein the moving duct is divided into:
a first moving duct slidably inserted into the guide duct; and
a second moving duct slidably inserted into the first moving duct,
wherein the extension duct is slidably inserted into the second moving duct.

17. A vehicle comprising the duct of claim 1.

\* \* \* \* \*